United States Patent [19]

Clerke et al.

[11] Patent Number: 4,766,577

[45] Date of Patent: Aug. 23, 1988

[54] AXIAL BOREHOLE TELEVIEWER

[75] Inventors: Edward A. Clerke, Missouri City; Brent H. Larson, Sugarland, both of Tex.

[73] Assignee: Shell Oil Company, Houston, Tex.

[21] Appl. No.: 813,736

[22] Filed: Dec. 27, 1985

[51] Int. Cl.[4] .............................................. G01V 1/40

[52] U.S. Cl. ...................................... 367/911; 367/35; 181/105

[58] Field of Search ..................... 367/25, 86, 35, 104, 367/911, 912; 181/102, 104, 105, 106; 166/255, 113; 33/302-304; 324/220; 73/151; 250/256

[56] References Cited

U.S. PATENT DOCUMENTS

| | | | |
|---|---|---|---|
| Re. 31,074 | 11/1982 | Nolte | 367/86 X |
| 2,825,044 | 2/1958 | Peterson | 181/104 X |
| 2,837,727 | 6/1958 | Mayes | 367/120 X |
| 3,369,626 | 2/1968 | Zemanek, Jr. | 367/35 X |
| 3,478,839 | 11/1969 | Zemanek, Jr. | 367/35 X |
| 3,517,767 | 6/1970 | Straus et al. | 367/35 X |
| 3,631,385 | 12/1971 | Silverman | 367/35 X |
| 3,668,619 | 6/1972 | Dennis | 367/35 X |
| 3,718,204 | 2/1973 | Groenendyke | 367/35 X |
| 4,008,603 | 2/1977 | Paulissen | 73/151 X |
| 4,212,207 | 7/1980 | Conradi | 73/151 X |
| 4,292,679 | 9/1981 | Kondo et al. | 367/120 X |
| 4,463,378 | 7/1984 | Rambow | 358/112 |
| 4,542,488 | 9/1985 | Clishem et al. | 367/35 |

FOREIGN PATENT DOCUMENTS

| | | | |
|---|---|---|---|
| 1437489 | 5/1976 | United Kingdom | 367/120 |

*Primary Examiner*—Thomas H. Tarcza
*Assistant Examiner*—Tod R. Swann

[57] ABSTRACT

A borehole televiewer scans forwardly to produce images of objects longitudinally ahead of the televiewer. The transducer is orbited around the bottom of the televiewer housing and simultaneously moves radially inwardly and outwardly thereacross to image an entire solid angle across a transverse section of the borehole ahead of the televiewer.

4 Claims, 2 Drawing Sheets

FIG. 1
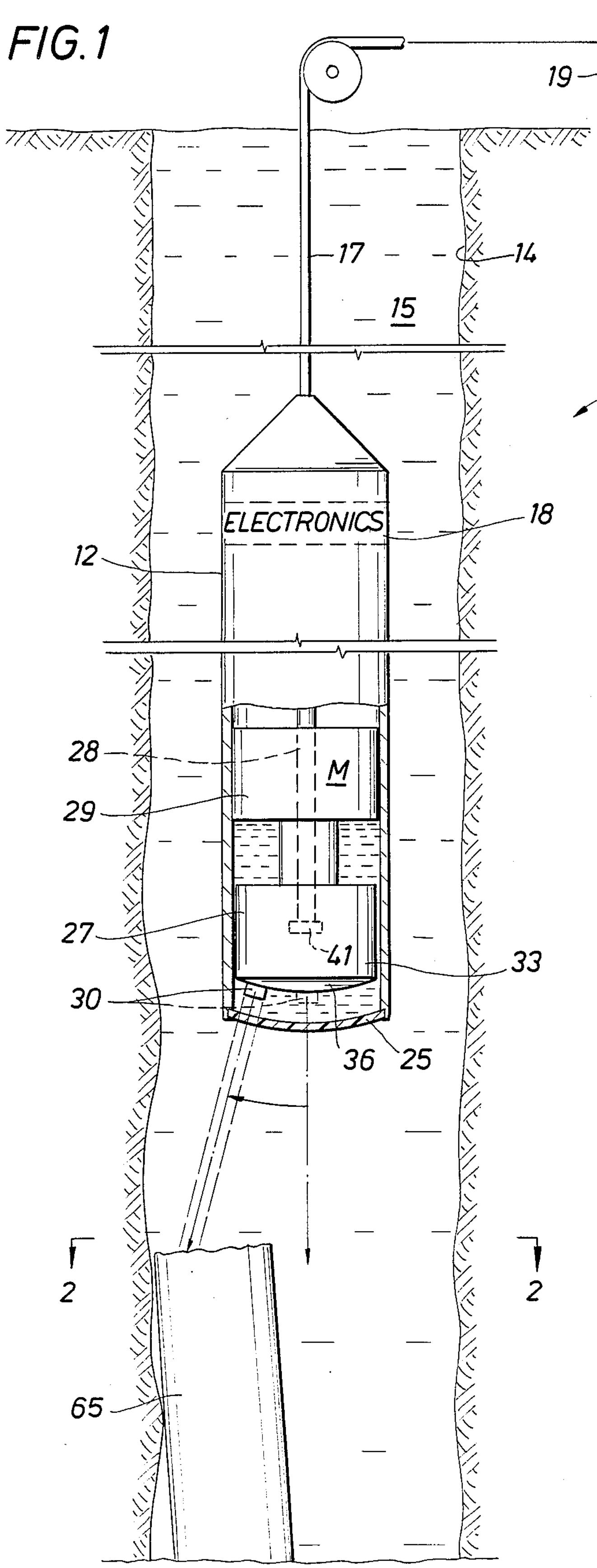
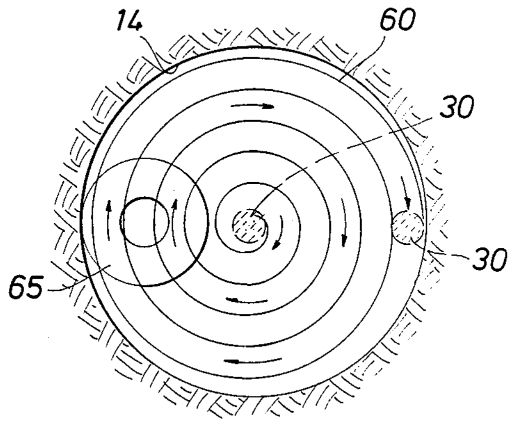
FIG. 2

FIG. 3
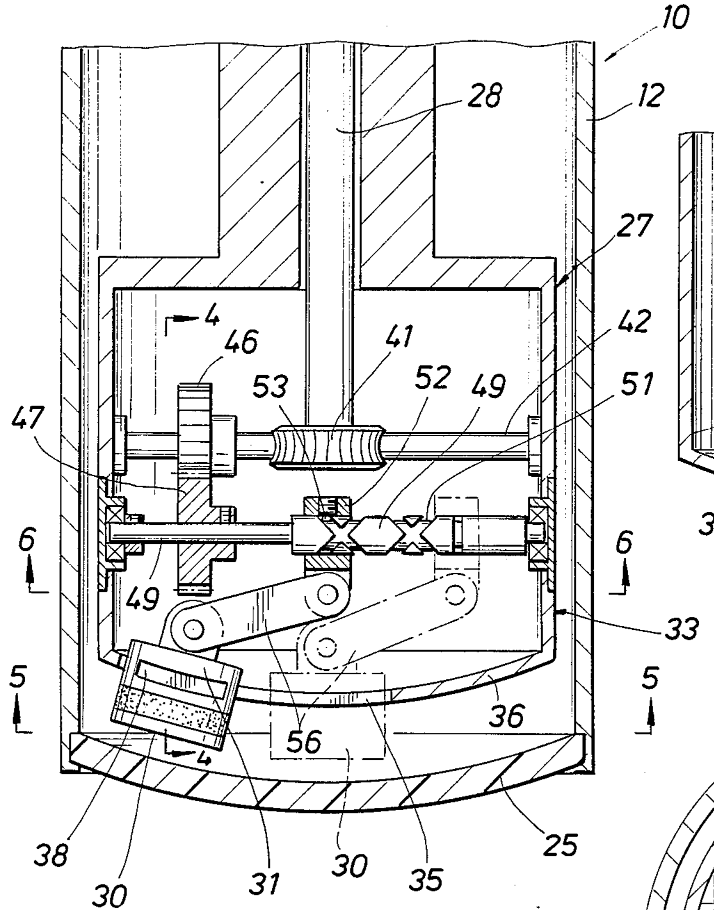
FIG. 4
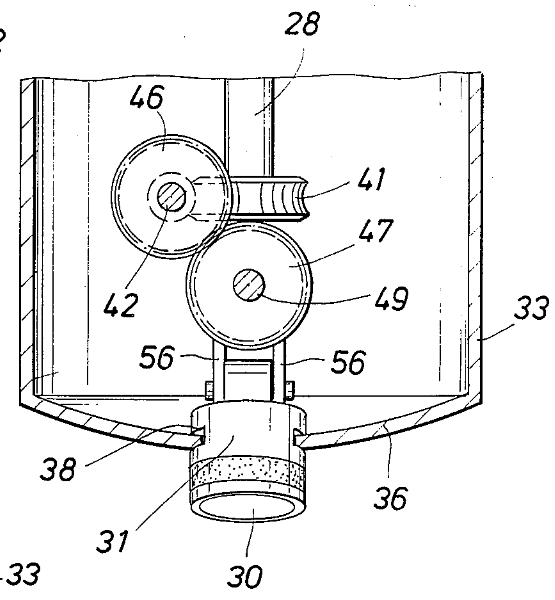
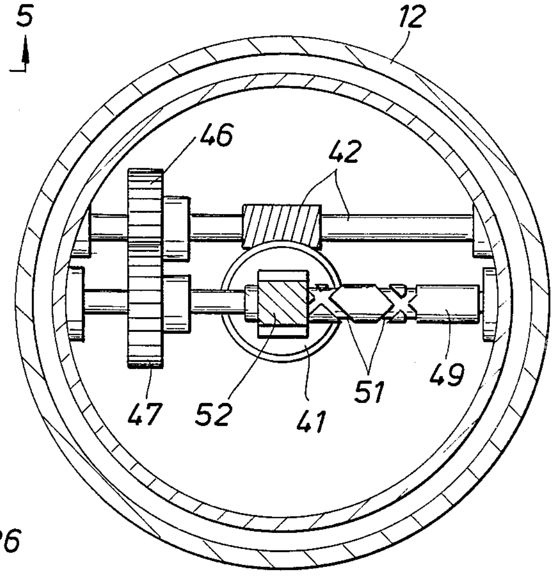
FIG. 6
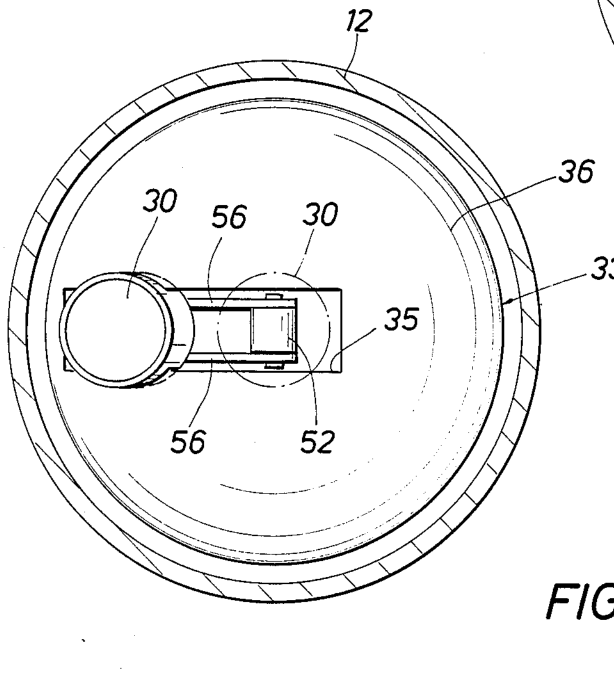
FIG. 5

AXIAL BOREHOLE TELEVIEWER

BACKGROUND OF THE INVENTION

The present invention relates to well logging, and in particular to improvements in a borehole logging tool referred to as a borehole televiewer, or BHTV. Tools of this type are described, for example, in U.S. Pat. Nos. 3,369,626 (Zemanek, Jr. issued Feb. 20, 1968), 3,478,839 (Zemanek, Jr. issued Nov. 18, 1969), and 4,463,378 (Rambow, issued July 31, 1984).

In general, borehole televiewer logging tools operate acoustically by periodically pulsing a rotating acoustic transducer to emit a sequence of acoustical pulses directionally into the borehole toward the borehole wall, and analyzing the echos which are reflected back to the tool. The amplitude of the reflected signal may then be displayed on a cathode ray tube, the display sometimes being photographed for future reference. Typically, the display represents a map of the borehole wall split along the north direction and laid out flat. Alternatively, a polar display may be produced, in which case the radius of the circular trace is determined by the time-of-flight of the acoustic pulse, thus presenting a cross-sectional profile of the borehole. Another display, similar to the amplitude display, is modulated by the time-of-flight signal rather than the amplitude signal. The latter can be converted into a pseudo-three-dimensional image by adding a slight bias to the vertical sweep according to the magnitude of the time-of-flight signal. BHTV tools typically include means for monitoring the tool orientation within the borehole, such as a fluxgate magnetometer rotating in unison with the transducer. A good technical description of a borehole televiewer suitable for use in geothermal environments may be found in "Development of a Geothermal Acoustic Borehole Televiewer", by Fred B. Heard and Tom J. Bauman, Sandia Report SAND83-0681, August 1983.

One of the principal and extremely valuable benefits furnished by the BHTV logging tool is the pseudo "visual" image of the borehole wall which it furnishes. Subtleties in the formation, bedding, bedding planes, dip, and so forth, can be observed and studied in a manner completely unavailable elsewhere. Especially in the oil industry, convention conventional optical viewing devices do not suffice, in part due to the typically extremely hostile environment, but primarily because the fluid medium in the borehole is normally opaque to optical energy.

As shown in the above-noted publications, borehole televiewers scan radially with a single transducer, thus essentially looking at a small ring encircling the transducer in the transverse plane thereof. As the borehole televiewer is then moved vertically through the borehole, the path or trail of this ring, as it moves along the borehole wall, in turn describes the wall. This description is then accumulated to generate the displays discussed above.

There has long been a need, particularly in the drilling industry, to be able to look ahead as well as sideways. For example, in drilling an oil well, the well may extend to 10,000 or 20,000 or more feet beneath the surface. Not uncommonly, articles (junk) such as tools, drill string, bits, hammers, and so forth, may be lost in the borehole. Sometimes they simply fall in from the surface. More commonly, a piece of equipment will break or become stuck in the borehole. Thus, the junk may not always be at the very bottom. Before drilling can proceed, an effort must obviously be made to remove the junk, referred to within the industry as a "fish", from the borehole. This procedure is called "fishing", and is a very sophisticated specialty in the drilling arts.

Before one can go fishing in a borehole, however, it is helpful to know where the fish is and what sort of upward profile it presents, so that the appropriate fishing tool can be selected and properly positioned. Heretofore, this type of determination has not been quite so sophisticated. Typically, it involves lowering a lead or tar block into the borehole and dropping it forcefully against the fish to make an impression in the block. The impression is then analyzed, and the attempts to remove the fish proceed accordingly.

A need therefore remains for a substantially improved method and apparatus for "looking" ahead in a visually opaque borehole environment where conventional optical imaging cannot effectively be performed. A need also remains for such a tool which can thus provide, for example, a far superior means for locating and defining lost articles in such a borehole.

SUMMARY OF THE INVENTION

Briefly, the present invention meets the above needs and purposes with an axial borehole televiewer which is able to generate a forward-looking image across an entire transverse section of the borehole rather than just a single linear ring surrounding the tool. The present invention accomplishes this improvement even though conventional optical imaging cannot be utilized. Instead, the present invention, using but a single point source acoustic transducer, provides for imaging an entire solid angle across a transverse section of the borehole ahead of the BHTV tool.

The preferred embodiment of the axial borehole televiewer according to the present invention starts with basic components already known in the BHTV art. Thus, the tool includes a housing which is moveable longitudinally within the borehole, a directional acoustical transducer, and electronic circuit means (partially downhole in the housing and partially uphole in the equipment at the surface) which is coupled to the transducer to cause it to emit a sequence of directional acoustic pulses into the borehole and to produce signals which are representative of the amplitude and of the time delays of the acoustic pulses which are reflected back and received by the transducer.

Unlike prior tools, however, the transducer in the present invention is not simply mounted on a rotor at a fixed radial orientation to be spun in a circle for scanning sideways around the borehole wall. Instead, the present invention furnishes a mounting and scan means, which in the preferred embodiment is on the bottom of the housing, which causes the transducer to scan the area (rather than just a line) of the borehole therebeneath.

More particularly, the mounting and scan assembly, in the preferred embodiment, supports the transducer on the bottom of the housing pointing in a generally longitudinal direction along the borehole so that the acoustic pulses which it generates are accordingly directed substantially longitudinally into the borehole. In the preferred embodiment, a motor and rotating chassis such as used in prior art borehole televiewers are utilized. The chassis is located on the bottom of the tool, supported on a stationary vertical shaft for rotation therearound, and driven through a concentric drive shaft by a motor located thereabove. As indicated, however, rather than mounting the transducer on the chassis in a fixed laterally oriented position, to emit pulses through a suitable window in the housing toward the lateral portions of the borehole wall, the present invention employs a special sub-chassis which is carried on the bottom of the motor-driven main chassis. The transducer is carried on the sub-chassis, and the window in the housing, in the preferred embodiment, extends across the bottom or nose of the tool.

The sub-chassis, preferably driven by and in response to rotation of the main chassis, orients the transducer to point substantially longitudinally along the borehole. In addition, the sub-chassis causes the transducer to move in a manner which scans across an entire transverse section of the borehole. In the preferred embodiment, these movements are synchronized with the rotation of the main chassis, so that the transducer simultaneously orbits around the longitudinal axis of the housing while walking radially inwardly and outwardly across the bottom of the housing. This motion is accomplished while the transducer is emitting and receiving the sequence of acoustic pulses, the pulses thus being transmitted and received across the corresponding areal extent of the borehole.

In the preferred embodiment, the sub-chassis includes a self-reversing cam and follower drive which are coupled to the transducer. As the sub-chassis is rotated in its plane (which is perpendicular to the longitudinal axis of the housing) the cam and follower (a type of oscillating means) periodically moves the transducer radially back and forth inwardly and outwardly along an arcuate substantially radial line extending across the bottom of the housing from the axis of rotation of the sub-chassis to the outer edge thereof. In the preferred embodiment, the period of the oscillating means includes a plurality of rotations of the sub-chassis in its plane, so that the acoustical transducer thereby describes a spiral pattern inwardly and outwardly across the borehole as the acoustic pulses are emitted and reflected in the borehole. In the preferred embodiment, the transverse movements of the transducer on the sub-chassis are precisely correlated with the rotational movements thereof around the tool longitudinal axis, so that the precise position of the transducer at any given moment can be determined. By this means, the electronic signals produced in response to the transmission and reception of the emitted and reflected acoustic pulses can be easily correlated with the corresponding transverse section scan positions of the transducer. The electronic signals, being thereby associated with the corresponding physical scan positions, are then displayed. The displayed information may be recorded photographically or electronically, as may be desired.

It is therefore an object of the present invention to provide an improved borehole televiewer method and apparatus, and in particular such a method and apparatus which provide for axial borehole televiewing; such a method and apparatus which are thus particularly suited for locating lost articles in a borehole; which include a housing moveable longitudinally within a borehole, an acoustical transducer mounted on the housing by a suitable transducer mounting means, a circuit means coupled to the transducer to cause the transducer to emit a sequence of acoustic pulses into the borehole and to produce signals functionally related to the acoustic pulses reflected back and received by the transducer, a scan means coupled to the acoustical transducer for scanning a portion of the acoustic pulses through a portion of a transverse section of the borehole, and means for correlating the signals produced by the circuit means with the corresponding transverse section scan positions of the acoustic pulses; in which the pulses are thus emitted substantially longitudinally along the borehole; in which the transducer can be walked radially inwardly and outwardly across the bottom of the housing while being simultaneously orbited around the longitudinal axis thereof as the transducer is emitting and receiving a sequence of acoustic pulses to transmit and receive pulses across the corresponding areal extent of the borehole; and to accomplish these objects and purposes in an inexpensive, uncomplicated, durable, versatile and reliable method and apparatus, inexpensive to manufacture and implement, and readily suited to the widest possible utilization in borehole logging applications.

These and other objects and advantages of the invention will be apparent from the following description, accompanying drawings, and the appended claims.

BRIEF DESCRIPTION OF THE DRAWINGS

FIG. 1 is a somewhat figurative illustration showing an axial borehole televiewer according to the present invention scanning a lost article within a borehole;

FIG. 2 is a schematic cross-sectional view taken on view line 2—2 in FIG. 1, representing in exaggerated form the spiral scanning pattern described by the acoustic pulses as they scan across the transverse section of the borehole beneath the tool;

FIG. 3 is a fragmentary cross-sectional view of the bottom portion of the axial BHTV tool shown in FIG. 1, illustrating in greater detail the sub-chassis and oscillating scanning assembly;

FIG. 4 is a cross-sectional view taken generally on line 4—4 in FIG. 3;

FIG. 5 is a cross-sectional view taken on line 5—5 in FIG. 3; and

FIG. 6 is a cross-sectional view taken on line 6—6 in FIG. 3.

DESCRIPTION OF THE PREFERRED EMBODIMENT

With reference to the drawings, the new and improved axial borehole televiewer, and the method for axially logging a borehole therewith, according to the present invention, will be described. FIG. 1 shows an axial borehole televiewer system 10 including a downhole sonde in a housing 12 positioned in a borehole 14 filled with fluid 15. The sonde housing 12 is supported in borehole 14 by a conventional logging cable 17. Cable 17 provides both physical support for moving the sonde vertically within borehole 14, and also as a communications link between the electronics package 18 located in housing 12 and the surface electronics 19 located at the top of borehole 14. System 10 also includes a suitable display unit 21, such as a CRT display, and a recorder such as a video recorder 22.

The bottom or nose of housing 12 is an acoustic window 25. Window 25 may be formed of the same material already used in borehole televiewers, typically a plastic material. Above this window, a chassis 27 is supported and rotated on a stationary shaft 28 by a drive motor 29, in a manner substantially the same as in prior art borehole televiewers. Thus, control of chassis 27, determination of the orientation thereof (as with a fluxgate magnetometer), and generation and interpretation of the acoustic pulses under the control of the electronics packages 18 and 19, is in accordance with conventional known techniques and hardware.

In the preferred embodiment of the present invention, however, the acoustical transducer 30 for the borehole televiewer system 10 is not mounted on chassis 27 in a fixed position pointing radially sideways toward the borehole wall. Instead, it is carried on a mounting base 31 which is mounted on the bottom of chassis 27, the lower portion of which, for ease of description (there being no corresponding analog in the prior art), is designated herein as a sub-chassis 33. Sub-chassis 33 supports and mounts the transducer assembly 30-31 thereon for transverse lateral movement inwardly and outwardly along an arc across the bottom thereof, and supports the mechanism for thus moving transducer 30, as more particularly described below.

With reference to FIG. 5, it may be seen that transducer assembly 30-31 is supported for sliding movement in a slot 35 passing through the bottom 36 of sub-chassis 33. In the preferred embodiment, slot 35 extends from the center of bottom 36 to one edge thereof. Any suitable means may be provided, of course, for supporting transducer 30 for such lateral movement across the bottom of sub-chassis 33. As described and shown herein, slot 35 is simply slightly narrower than the diameter of mounting base 31, such that the edges of slot 35 are received in guide channels 38 in the sides of base 31 to capture the transducer assembly 30-31 in slot 35 while providing for the lateral translation of the transducer assembly therealong.

The mechanism for oscillating transducer 30 in slot 35 is shown particularly in FIGS. 3–6. A pinion 41 is secured to shaft 28 in driving contact with a worm shaft 42 (See FIG. 6). Shaft 42 is journaled at both ends in sub-chassis 33, and thus rotates around pinion 41 as motor 29 drives chassis 27 and the sub-chassis 33 mounted thereon. As chassis 27 and sub-chassis 33 thus rotate in response to the drive power of motor 29, worm shaft 42 is driven at a much slower rotational rate. A reduction gear 46 on shaft 42 drives a reduction gear 47 which is drivingly attached to a lead screw 49. Lead screw 49 is also journaled at both ends in sub-chassis 33 and rotates end-to-end in synchronism therewith. As it is thus spun end-to-end on sub-chassis 33 in a horizontal plane, it is driven by reduction gears 46 and 47 to turn on its own axis at a substantially reduced rotational rate relative to that of the sub-chassis 33. Lead screw 49 has a cam race 51 therein which forms a self-reversing left and right lead screw, of a type well-known, for example in strip recorders, etc. A cam follower 52 is slideably supported on lead screw 49 and has a cam 53 captured in race 51. Cam follower 52 rotates along with sub-chassis 33 in a horizontal plane, but, as described below, is prevented from rotating around the longitudinal axis of lead screw 49. Thus, as the entire assembly is rotated by motor 29, lead screw 49 turns within cam follower 52. Cam 53 and cam follower 52, accordingly, are reciprocated inwardly and outwardly along lead screw 49 as cam 53 is propelled through cam race 51.

Cam follower 52 is held against rotation around the longitudinal axis of lead screw 49 by a pair of links 56 (FIG. 3) pivotally connected between transducer assembly 30-31 and cam follower 52. Links 56, in turn, propel the transducer assembly 30 back and forth through slot 35 as cam follower 52 is similarly reciprocated by lead screw 49. Thus, as motor 29 spins chassis 27 (for example, at 3 revolutions per second), transducer 30 is reciprocated inwardly and outwardly at a much much slower rate across the bottom 36 of sub-chassis 33. A spiral scanning pattern 60, as figuratively shown in FIG. 2, results. In the preferred embodiment, the turns of the spiral will actually be much closer, FIG. 2 having been exaggerated for clarity of illustration.

Finally, since the oscillating movement of transducer 30, under the control of lead screw 49 and cam follower 52, is synchronized with the rotation of chassis 27, the scan position of transducer 30 for each pulse and echo transmitted and received thereby is accordingly known once calibrated. This information is encoded by conventional means in electronics package 18 and transmitted to the surface where it is decoded by electronics package 19 and appropriately displayed and recorded, as desired.

As may be seen, therefore, the present invention has numerous advantages. Rather than simply scanning a single ring (which geometrically is essentially a one dimensional scan with closed ends), and sliding this ring along the borehole to unfold a picture of the borehole wall, the present invention in fact scans an entire solid angle. By this invention, therefore, using but a single transducer element emitting but one pulse and receiving but one echo at a time, imaging across an entire surface (two-dimensional field) in real time is provided. The present invention thus now makes it possible, in the extremely difficult logging environment of an oil well borehole, to provide a forward-looking or axial pseudo-visual image in an opaque operating environment. Of particular value, it is now practical to utilize a borehole televiewer, according to the present invention, to aid in recovering lost articles in a borehole. Such a lost article 65 is shown being scanned in FIGS. 1 and 2, and displayed on display 21 at the top of borehole 14. Important and valuable information is thus readily, quickly and easily provided concerning the location, orientation, and configuration of the article which must be retrieved from the borehole.

Although a preferred embodiment has thus been described in detail, it will be clear that the present invention encompasses a number of variations thereon. For example, mechanical synchronization of the transducer assembly lateral position in slot 35 with the rotated position of sub-chassis 33 around the axis of shaft 28 is not completely necessary. These two positions can be separately encoded and just as easily used by the electronics packages to construct the appropriate display. For example, the individual echo signals could be easily assigned to a memory matrix according to the particular scan position of the transducer 30 at each transmitted and received pulse. Rather than encoding the exact position of the transducer 30 in slot 35, another variation would be to include an end-of-travel detector (such as a switch) which would detect when the movement of the transducer in slot 35 was being reversed, and the intermediate positions could be easily interpolated. Or an acoustic reflector or telltale tag on the inside of window 25 at a predetermined radius could be used to generate a unique short range echo for synchronizing the radial position each pass thereover. Other variations will readily occur to those skilled in the art, although such calibrated mechanical synchronization is believed at present to be the simplest, and to require the least complicated electronics.

It will also be clear to those skilled in the art, upon reading the present description, that a major functional object is to sweep the acoustic pulses. While the preferred embodiment accomplishes this end by oscillating the transducer, it will be clear that the pulses could be swept by other suitable means. For example, the transducer might be fixedly pointed toward a moveable reflector, with the sweep being effected by means of changes in the angle of reflection. Also, combinations of these features, perhaps reducing the movement of the transducer and amplifying the effect through a coordinated moveable reflector, etc., are all within the scope of the present invention.

The present invention thus provides an inexpensive, uncomplicated, durable, versatile and reliable axial borehole televiewer method and apparatus, which is particularly well suited for locating lost articles in a borehole. The invention, which is inexpensive to manufacture and implement, is thus readily suited to the widest possible utilization in borehole televiewer logging applications.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. An axial borehole televiewer, comprising:

a housing movable longitudinally within a borehole;

an acoustical transducer;

circuit means coupled to said transducer to cause said transducer to emit a sequence of acoustic pulses into the borehole and to produce signals functionally related to the acoustic pulses reflected back and received by said transducer;

mounting and scan means within the bottom of said housing for mounting said acoustical transducer within the bottom of said housing for scanning the borehole therebeneath, said mounting and scan means including:

(i) means orienting said transducer to emit at least a portion of said acoustic pulses substantially longitudinally along the borehole; and (ii) moving means for moving said transducer within said housing to scan across a transverse section of said borehole, said moving means including means for simultaneously orbiting said transducer around the longitudinal axis of said housing and moving said transducer radially inwardly and outwardly across at least a portion of the bottom of said housing while said transducer is emitting and receiving said sequence of acoustic pulses, to transmit and receive said pulses across the corresponding areal extent of the borehole, said means for simultaneously orbiting and moving said transducer further including:

(a) a sub-chassis rotatably supported at the bottom of said housing for rotation substantially in a plane substantially perpendicular to the longitudinal axis of said housing;

(b) drive means coupled to said sub-chassis for rotating said sub-chassis in said plane; and (c) oscillating means coupled to said drive means and driven in response to said rotation of said sub-chassis in said plane for moving said transducer radially inwardly and outwardly to provide a period for said oscillating means which includes a plurality of rotations of said sub-chassis in said plane; and correlation means for correlating said signals produced by said circuit means with the corresponding transverse section scan positions of said transducer.

2. An acoustic borehole televiewer method for axially logging a borehole, comprising:

emitting, by using an acoustical transducer supported on a mounting means located within the bottom of a housing movable longitudinally within the borehole, a sequence of acoustic pulses into the borehole and scanning the acoustic pulses through a transverse section of the borehole, the transducer being oriented to emit at least a portion of the acoustic pulses substantially longitudinally along the borehole;

receiving the acoustic pulses which are reflected back in the borehole;

performing said scanning across a transverse section of the borehole by simultaneously orbiting the transducer, on a sub-chassis within the housing, around the longitudinal axis of the housing and moving the transducer radially inwardly and outwardly across at least a portion of the bottom of the housing while the transducer is emitting and receiving the sequence of acoustic pulses, to transmit and receive the pulses across the corresponding areal extent of the borehole, the sub-chassis being rotatably supported on the mounting means at the bottom of the housing for rotation substantially in a plane substantially perpendicular to the longitudinal axis of the housing, and for oscillating and moving the transducer, in response to said rotation thereof in the plane, radially inwardly and outwardly, the period of said oscillation including a plurality of rotations of the sub-chassis in the plane;

producing signals functionally related to the acoustic pulses reflected back and received by the transducer; and correlating the signals produced with the corresponding transverse section scan positions of the transducer.

3. An axial borehole televiewer particularly suited for locating lost articles in a borehole, comprising:

(a) a housing moveable longitudinally within a borehole, (b) a directional acoustical transducer, (c) circuit means coupled to said transducer to cause said transducer to emit a sequence of directional acoustic pulses into the borehole and to produce signals which are representative of the amplitudes and of the time delays of the acoustic pulses which are reflected back and received by said transducer, (d) mounting and scan means within the bottom of said housing for mounting said acoustical transducer within the bottom of said housing for scanning the borehole therebeneath, said mounting and scan means including:

(i) means orienting said transducer to point substantially longitudinally along the borehole to direct at least a portion of said acoustic pulses substantially longitudinally into the borehole, and (ii) moving means for moving said transducer within said housing to scan across a transverse section of said borehole, said moving means including means for simultaneously orbiting said transducer around the longitudinal axis of said housing and walking said transducer radially inwardly and outwardly across the bottom of said housing while said transducer is emitting and receiving said sequence of acoustic pulses, to transmit and receive said pulses across the corresponding areal extent of the borehole, said means for simultaneously orbiting and walking said transducer further including:

(a) a sub-chassis rotatably supported at the bottom of said housing for rotation substantially in a plane substantially perpendicular to the longitudinal axis of said housing, (b) drive means coupled to said sub-chassis for rotating said sub-chassis in said plane, and (c) oscillating means coupled to said drive means for moving said transducer, in response to said rotation thereof in said plane, periodically radially back and forth inwardly and outwardly along an arcuate substantially radial line extending across the bottom of said housing from the axis of rotation of said sub-chassis to the outer edge thereof, the period of said oscillating means including a plurality of rotations of said sub-chassis in said plane, said acoustical transducer thereby describing a spiral pattern across the borehole as said acoustic pulses are emitted and reflected in the borehole, (e) correlation means for correlating said signals produced by said circuit means with the corresponding transverse section scan positions of said transducer, (f) display means coupled to said circuit and correlation means for generating a borehole televiewer polar display as a predetermined function of said signals produced by said circuit means and of the corresponding scan positions of said transducer, and (g) means for recording said signals produced by said circuit means.

4. An acoustic borehole televiewer method for axially logging a borehole to locate lost articles therein, comprising:

(a) emitting, by using a directional acoustical transducer supported on a mounting means located within the bottom of a housing moveable longitudinally within the borehole, a sequence of directional acoustic pulses into the borehole and scanning the acoustic pulses through a transverse section of the borehole, the transducer being oriented to point substantially longitudinally along the borehole to direct at least a portion of the acoustic pulses substantially longitudinally into the borehole, (b) receiving the acoustic pulses which are reflected back in the borehole, (c) performing said scanning across a transverse section of the borehole by simultaneously orbiting the transducer, on a sub-chassis within the housing, around the longitudinal axis of the housing and walking the transducer radially inwardly and outwardly across the bottom of the housing while the transducer is emitting and receiving the sequence of acoustic pulses, to transmit and receive the pulses across the corresponding areal extent of the borehole, the sub-chassis being rotatably supported on the mounting means at the bottom of the housing for rotation substantially in a plane substantially perpendicular to the longitudinal axis of the housing, and for oscillating and moving the transducer, in response to the rotation thereof in the plane, periodically radially back and forth inwardly and outwardly along an arcuate substantially radial line extending across the bottom of the housing from the axis of rotation of the sub-chassis to the outer edge thereof, the period of said oscillation including a plurality of rotations of the sub-chassis in the plane, the acoustical transducer thereby describing a spiral pattern across the borehole as the acoustic pulses are emitted and reflected in the borehole, (d) producing signals which are representative of the amplitudes and of the time delays of the acoustic pulses which are reflected back and received by the transducer, (e) correlating the signals produced with the corresponding transverse section scan positions of the transducer, (f) generating a borehole televiewer polar display as a predetermined function of the signals produced and of the corresponding scan positions of the transducer, and (g) recording the signals produced.

* * * * *